(12) United States Patent
Amirkhanian et al.

(10) Patent No.: US 8,167,966 B2
(45) Date of Patent: May 1, 2012

(54) REPLACEABLE FILTER CARTRIDGE WITH REMOVAL FEATURE

(75) Inventors: Hendrik Amirkhanian, Cookeville, TN (US); Ismail Bagci, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 423 days.

(21) Appl. No.: 12/080,879

(22) Filed: Apr. 7, 2008

(65) Prior Publication Data

US 2009/0249754 A1   Oct. 8, 2009

(51) Int. Cl.
*B01D 46/00* (2006.01)
(52) U.S. Cl. ............... 55/357; 55/498; 55/502; 55/510; 210/470; 210/493.2; 210/497.01
(58) Field of Classification Search .............. 55/356, 55/357, 498, 510, 502; 210/443, 444, 470, 210/493.2, 497.01
See application file for complete search history.

(56) References Cited

U.S. PATENT DOCUMENTS

| | | | | |
|---|---|---|---|---|
| 3,209,917 A * | 10/1965 | Yelinek | .......................... | 210/484 |
| 3,415,041 A * | 12/1968 | Kraissl, Jr | ........................ | 55/342 |
| 3,849,312 A * | 11/1974 | Wecker, Sr. | ................... | 210/237 |
| 4,014,672 A * | 3/1977 | Jansson | ............................ | 55/357 |
| 4,194,894 A * | 3/1980 | Noland | ............................ | 55/379 |
| 4,292,057 A * | 9/1981 | Ulvestad et al. | ................ | 55/302 |
| 5,211,846 A * | 5/1993 | Kott et al. | ..................... | 210/232 |
| 5,328,609 A | 7/1994 | Magnusson et al. | | |
| 6,607,665 B2 | 8/2003 | Fick et al. | | |
| 6,627,078 B1 | 9/2003 | Wagner et al. | | |
| 6,706,182 B2 | 3/2004 | Schuyler | | |
| 6,752,924 B2 * | 6/2004 | Gustafson et al. | ............ | 210/232 |
| 6,939,464 B1 * | 9/2005 | Jiang et al. | ..................... | 210/232 |
| 7,132,048 B2 * | 11/2006 | Hagashihara | .................. | 210/232 |
| 7,326,342 B2 * | 2/2008 | Richmond et al. | ............ | 210/234 |
| 7,473,360 B2 * | 1/2009 | Hoffman et al. | ............... | 210/236 |
| 7,614,504 B2 * | 11/2009 | South et al. | .................... | 210/443 |
| 2003/0183568 A1* | 10/2003 | Hoffman et al. | ............... | 210/232 |
| 2004/0232059 A1* | 11/2004 | Gustafson et al. | ............ | 210/232 |
| 2006/0011534 A1 | 1/2006 | Hagashihara | | |
| 2007/0227959 A1* | 10/2007 | Sinur et al. | ..................... | 210/232 |

FOREIGN PATENT DOCUMENTS

| | | |
|---|---|---|
| JP | 2003-181227 A | 7/2003 |
| JP | 2005-522308 A | 7/2005 |
| KR | 20-0432281 Y1 | 11/2006 |

OTHER PUBLICATIONS

International Search Report of PCT/US2009/038554 dated Nov. 9, 2009.
Written Opinion of the International Searching Authority of PCT/US2009/038554, dated Nov. 9, 2009.

* cited by examiner

*Primary Examiner* — Robert Clemente
(74) *Attorney, Agent, or Firm* — Hamre, Schumann, Mueller & Larson, P.C.

(57) ABSTRACT

A replaceable filter cartridge including filter media defining a substantially columnar flow path sandwiched between first and second endcaps. The first endcap includes an opening fluidly connected to the substantially columnar flow path, leading to an interior cavity of the filter media defining a flow path. A sealing flange is aligned with the opening and extends axially away from the filter media. A handle is coupled to the sealing flange or a centerpost such that at least a portion of the handle extends into the flow path.

16 Claims, 4 Drawing Sheets

REPLACEABLE FILTER CARTRIDGE WITH REMOVAL FEATURE

BACKGROUND

The present invention relates generally to a filter unit and/or filter housing that can be used, for example, with internal combustion engines, such as diesel or gasoline powered engines. Such filter units are utilized since various fluids, including fuels, lubricating oils, etc., used in vehicle engines are susceptible to being contaminated by water, sand, dirt and other particulate materials.

Replaceable filter cartridges and assemblies have proven to be useful components of filtration systems for a variety of applications including, for example, internal combustion engines such as diesel engines. Replaceable filter cartridges can be coupled with other components of filtration systems to provide assemblies operable to remove particulates and other undesirable matter from fluids. The cartridge element lends itself to easier disposability, less total mass, smaller storage envelope, and many times a more user friendly service environment. There is a need for unique and inventive replaceable filter cartridges and assemblies.

SUMMARY

In one embodiment of the present invention there is a replaceable filter cartridge comprising a substantially annular filter media defining an internal cavity. The filter media is sandwiched between a first endplate and a second end plate. The first endplate includes a sealing flange extending axially away from the filter media and fluidly connected to the internal cavity via a flow opening defined by the first endplate. The cartridge further includes a handle extending across at least a portion of the opening and coupled to the sealing flange.

In one refinement of the invention the sealing flange is integrally formed with the first endplate.

In another refinement of the invention the handle is integrally formed with the sealing flange.

In another refinement of the invention the handle is U-shaped.

In another refinement of the invention the handle includes an offset portion positioned radially inward from the perimeter of the sealing flange.

In another refinement of the invention the cartridge further comprises a centerpost positioned in the internal cavity. The centerpost includes a plurality of apertures in flow communication with the internal cavity.

In another refinement of the invention the cartridge further comprises a gasket surrounding at least a portion of the sealing flange.

In another refinement of the invention at least a portion of the handle extends in a direction axially outward from the sealing flange.

In another embodiment of the present invention there is a replaceable filter cartridge comprising a filter media sandwiched between a first endplate and a second endplate. The first endplate includes an opening leading to an interior cavity of the filter media, the opening and the interior cavity defining a flow path. The first endplate further includes a sealing flange enclosing the opening and extending axially away from the filter media. The cartridge further includes means in the flow path for removing the replaceable filter cartridge.

In one refinement of the invention the cartridge further comprises a centerpost positioned within the interior cavity, wherein the centerpost includes a plurality of apertures fluidly connected to the interior cavity. The handle is connected to the centerpost.

In another refinement of the invention said means for removing the replaceable filter cartridge includes a handle connected to the first endplate, the handle extending across at least a portion of the opening.

In another refinement of the invention the handle is connected to the sealing flange via a snap fit. Alternatively, the handle might be connected to the sealing flange via a press fit, or threaded.

In another refinement of the invention the handle is U-shaped.

In another refinement of the invention the filter media is a substantially annular pleated cellulose filter media, and wherein the cartridge further includes a gasket surrounding at least a portion of the sealing flange.

In another embodiment of the present invention there is a replaceable filter cartridge comprising a filter media defining a substantially columnar internal flow path sandwiched between first and second endcaps. The first endcap includes an opening in flow communication with the substantially columnar flow path. The first endcap further includes a sealing flange aligned with and enclosing the opening, the flange extending axially away from the filter media. The cartridge further includes a handle coupled to the sealing flange and positioned such that at least a portion of the handle extends across the flow path.

In one refinement of the invention the cartridge further comprises a centerpost positioned in the substantially columnar internal flow path. The centerpost includes a plurality of apertures fluidly connected to the substantially columnar flow path for flow of fluid through said plurality of apertures into the substantially columnar flow path.

In another refinement of the invention the cartridge further comprises a gasket surrounding the sealing flange, and wherein the filter media is a substantially annular pleated cellulose filter media.

In another refinement of the invention the handle is integrally formed with the sealing flange.

In another refinement of the invention the handle includes at least a portion positioned in an axially spaced relation to a top edge of the sealing flange.

In another refinement of the invention the handle is connected to the sealing flange via a snap fit.

Further embodiments, forms, objects, features, advantages, aspects, and benefits shall become apparent from the following description and drawings.

DETAILED DESCRIPTION

Figure 1:
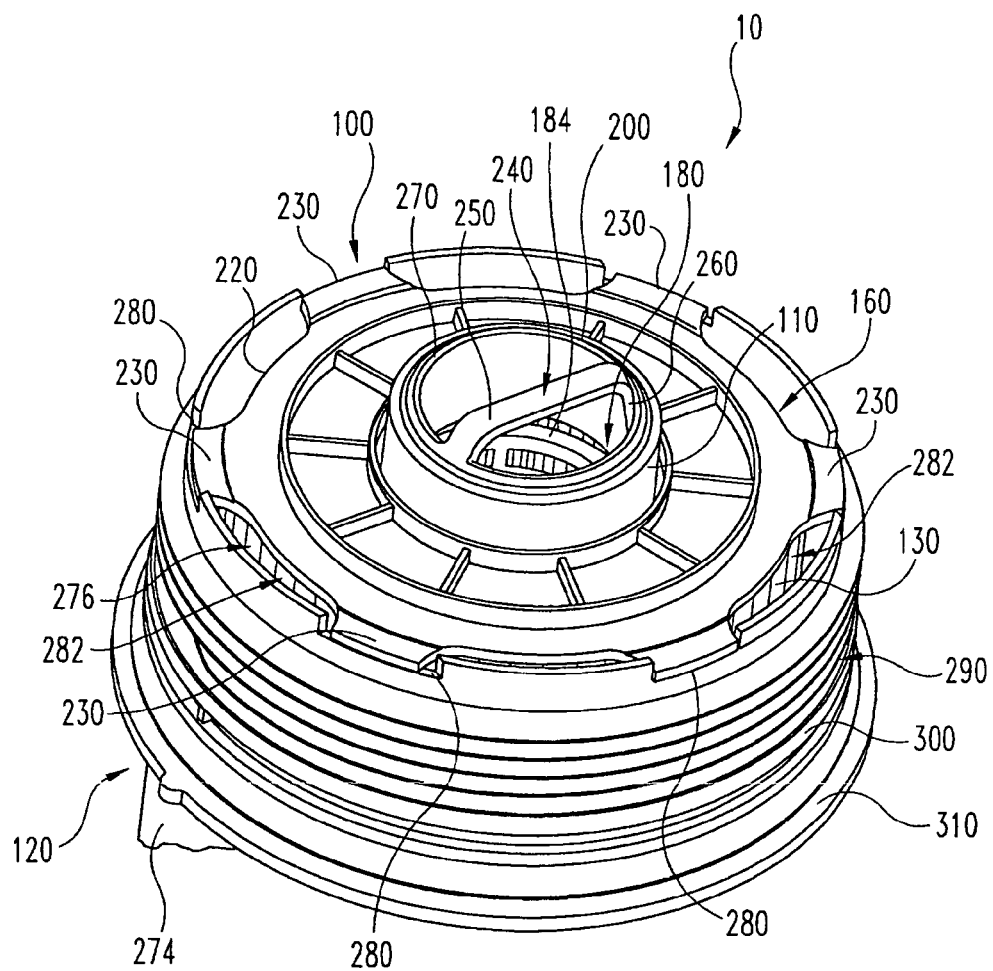
FIG. 1 is a perspective view of a portion of a filter assembly.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would occur to one skilled in the art to which the invention relates.

Figure 2:
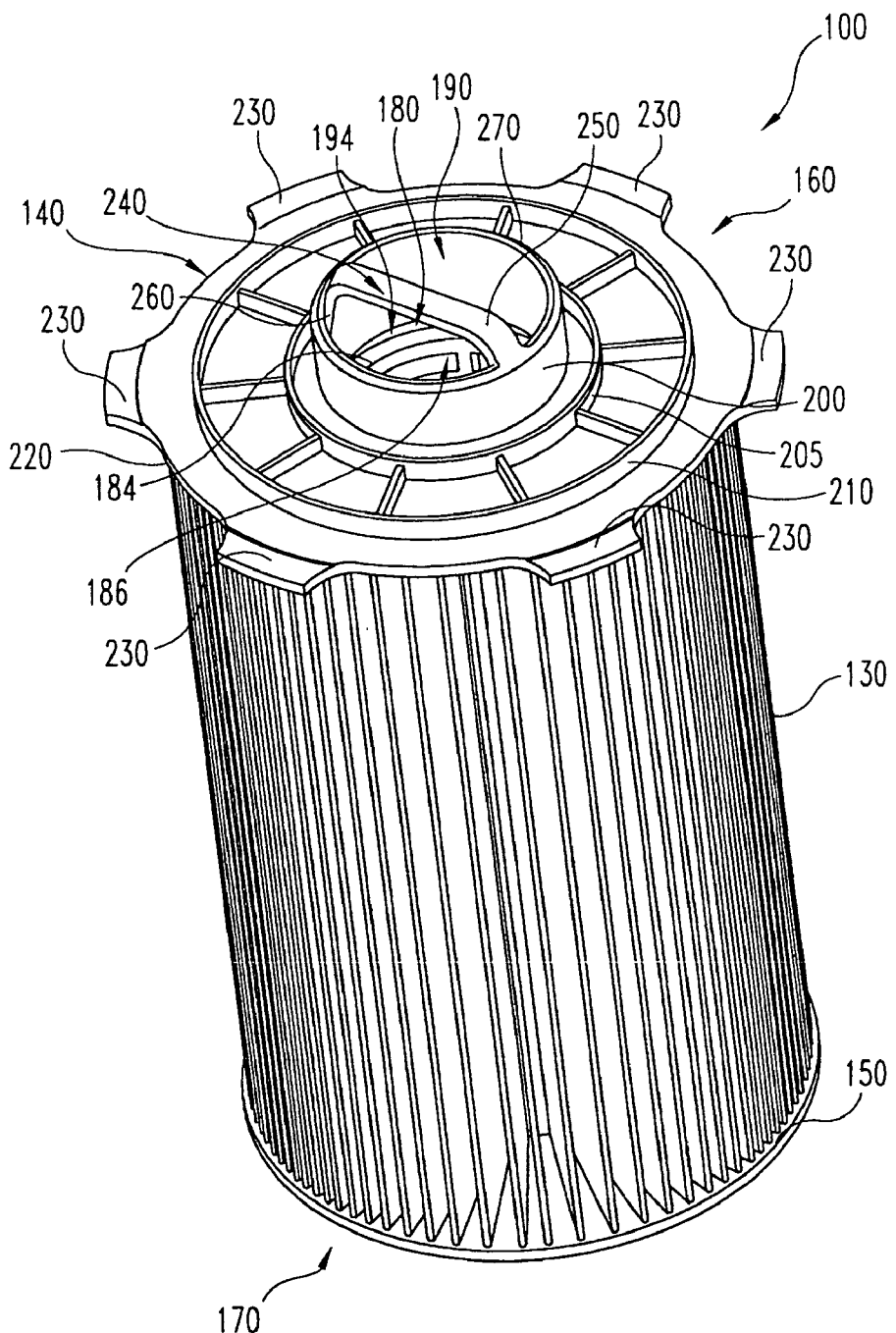
FIG. 2 is a perspective view of a replaceable filter cartridge.

With reference to FIG. 1 there is illustrated a perspective view of a portion of a filter assembly 10. Filter assembly 10 includes a replaceable filter cartridge 100, a gasket 110, and a shell 120 that is configured to couple to a filter head (not shown) that may include a head insert (not shown). As illustrated in FIG. 2, in one embodiment the replaceable filter cartridge 100 is a self-contained cartridge that includes a substantially annular filter media 130 positioned between a top endplate 140 and a bottom endplate 150. Endplates 140, 150 are each preferably a unitary structure formed of a composite or plastic material such as thermoplastic. Other embodiments contemplate that top endplate 140, bottom endplate 150, or both endplates 140, 150 could be formed of multiple pieces coupled together. Preferably, filter media 130 is sandwiched between and embedded in top endplate 140 and bottom endplate 150. In one form of the present application, filter media 130 is a substantially annular pleated cellulose filter media extending from a top end 160 to a bottom end 170 and defining an interior cavity 180 preferably having a substantially columnar hollow shape. Other forms of the present application contemplate other filter media configurations or compositions including, for example, a stack-disk bypass filter media that includes a plurality of stacked disks of filter media or other filter media configurations. In a form utilizing stacked-disks of filter media, each disk preferably includes a center opening aligned with a respective center opening of an adjacent disk forming a substantially columnar shaped interior cavity.

As shown in FIGS. 1 and 2, replaceable filter cartridge 100 includes a centerpost 184 positioned in interior cavity 180 and preferably extending from top endplate 140 to bottom endplate 150. Centerpost 184 is preferably coupled to at least one of top endplate 140 and bottom endplate 150. As shown in FIG. 2, centerpost 184 includes a plurality of apertures and/or perforations 186 fluidly connected to the interior cavity 180 creating a flow passage therebetween. Other embodiments contemplate replaceable filter cartridges without a centerpost.

Top endplate 140 includes an opening 190 leading to interior cavity 180 of filter media 130 defining a substantially columnar fluid flow path 194 with interior cavity 180. A sealing flange 200 is positioned adjacent opening 190 and extends upward from top endplate 140 in a generally axial direction. A flange 205 is preferably present and is radially outward from the sealing flange 200, the gasket 110 being positioned between sealing flange 200 and flange 205. A flange 210 is positioned radially outward from sealing flange 200 and also extends from endplate 140 in a generally axial direction. Top endplate 140 extends from opening 190 to an outer periphery 220 and preferably also includes a plurality of legs or projections 230 that extend from periphery 220. The cartridge includes a handle 240 to assist in removal of replaceable filter cartridge 100.

Referring back to FIG. 1, shell 120 includes a body wall 274 that defines a hollow interior space 276 into which replaceable filter cartridge 100 is inserted. Shell 120 includes a plurality of recesses 280 that receive legs 230 of top endplate 140. A plurality of fluid inlet openings 282 are formed between respective pairs of legs 230 and outer periphery 220 of top endplate 140 and shell 120. Additionally, shell 120 further includes external threads 290 that mate with respective threads (not shown) on the filter head, a sealing ring 300, and abutment flange 310. Shell 120 may further include a water drainage valve (not shown) located at the bottom of shell 120.

Sealing flange 200 defines a fluid outlet and is receivable in a corresponding opening (not shown) in the filter head to fluidly connect the substantially columnar fluid flow path 194 with the filter head. As shown in FIG. 1, gasket 110 is sized to seal sealing flange 200 in the opening in the filter head when sealing flange 200 is connected to the filter head to prevent leakage of fluid flowing through sealing flange 200 into the filter head. Gasket 110 is preferably formed from a compressible material like rubber to provide a tight seal to prevent leakage.

During operation of one form of the present invention, unfiltered fluid flows from the filter head (not shown) through fluid inlet openings 282 into interior space 276. Unfiltered fluid in interior space 276 passes through filter media 130 and through apertures 186 in centerpost 184 into interior cavity 180. The resulting filtered fluid flows along fluid flow path 194 and through the fluid outlet defined by sealing flange 200 into the filter head (not shown). Other forms of operation contemplate fluid flowing through filter media more than a single time and/or the reversing the direction of fluid flow (unfiltered fluid flows through sealing flange 200 into interior cavity 180 before flowing through filter media 130 and out openings 282.

As shown in FIGS. 1 and 2, handle 240 is preferably coupled to sealing flange 200 and positioned within fluid flow path 194 with sealing flange 200 preferably located on the outer peripheral edge of centerpost 184. Locating sealing flange 200 on the outer peripheral edge of centerpost 184 helps in preventing or eliminating any unfiltered fluid from bypassing filter media 130. Additionally, any detrimental flow effects from placing handle 240 within flow path 194 are minimized or eliminated by locating sealing flange 200 on the outer peripheral edge of centerpost 184 and sealing flange 200 against the filter head by clamping gasket 110 in the opening in the filter head. In one form of the present application, handle 240 is formed having an inverted U-shape including a radial or transverse portion 250 and a pair of axial portions 260. Radial portion 250 is preferably positioned at an axial distance at least partially extending above the top edge 270 of sealing flange 200. Radial portion 250 may be centered in opening 190 or might instead be positioned slightly off center of opening 190. While the axial position of radial portion 250 is described as extending at least partially outward from top edge 270, other forms contemplate radial portion 250 could be positioned flush with top edge 270 of sealing flange 200 or positioned at an axial distance extending beneath top edge 270, in both examples creating minimal or no detrimental flow effects.

Figure 3:
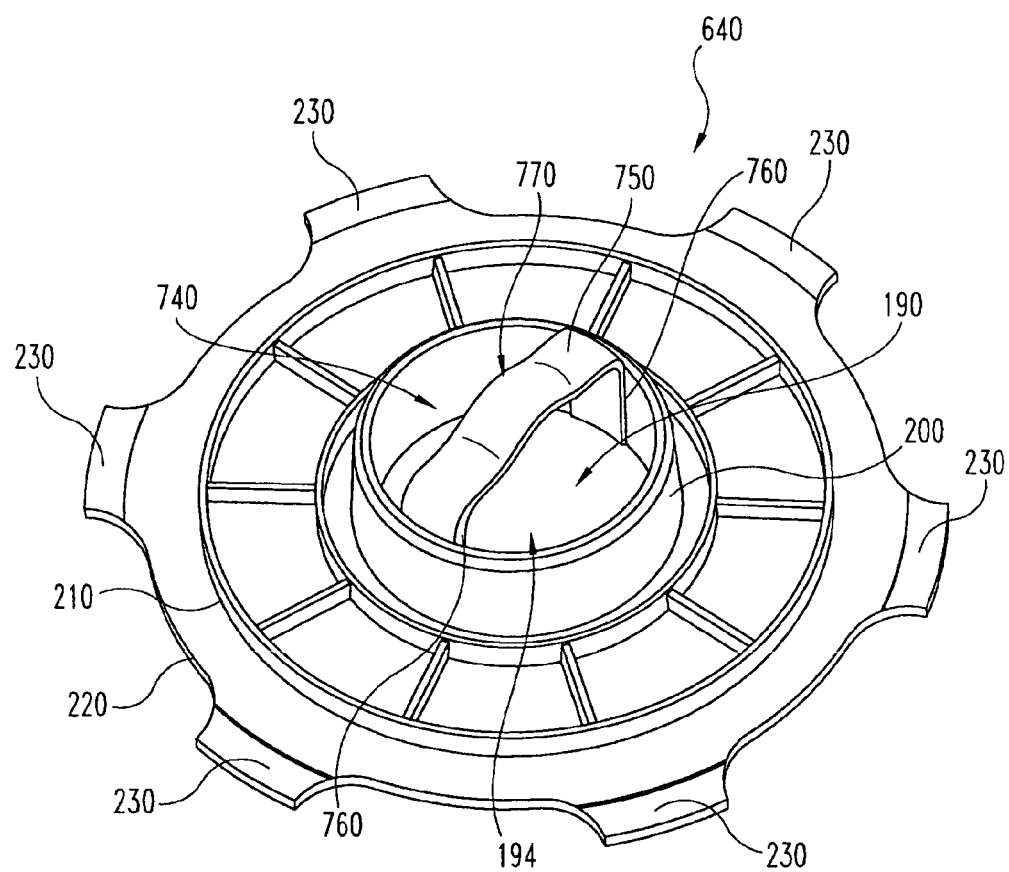
FIG. 3 is a perspective view of an endplate.

With reference to FIG. 3 there is illustrated a perspective view of an endplate 640 that is similar to top endplate 140, as described above, with like elements being labeled with reference numbers as previously used above. In one form of the present application, endplate 640 replaces top endplate 140 in replaceable cartridge 100 described above with reference to FIGS. 1 and 2. Endplate 640 includes opening 190 leading to the interior cavity of filter media defining the fluid flow path 194. Endplate 640 is preferably a unitary structure formed of a composite or plastic material such as thermoplastic. Other embodiments contemplate that endplate 640 could be formed of multiple pieces coupled together.

Endplate 640 further includes a handle 740 that is preferably coupled to sealing flange 200 and positioned within fluid flow path 194. Handle 740 is formed having a generally U-shape including a radial portion 750 and a pair of axial portions 760. Radial portion 750 is positioned at an axial distance at least partially extending above top edge 270 of sealing flange 200 and is preferably positioned slightly off center of opening 190. While the axial position of radial portion 750 is described as extending at least partially above top edge 270, other forms contemplate radial portion 750 could be positioned flush with top edge 270 of sealing flange 200 or positioned at an axial distance extending beneath top edge 270, in both examples creating minimal or no detrimental flow effects.

Radial portion 750 of handle 740 preferably includes a bump or offset portion 770 preferably having a generally arch shape. As described in further detail below, offset portion 770 is provided to assist gripping of handle 740 by the user and is preferably positioned radially inward from the inner perimeter of sealing flange 200.

Figure 4:
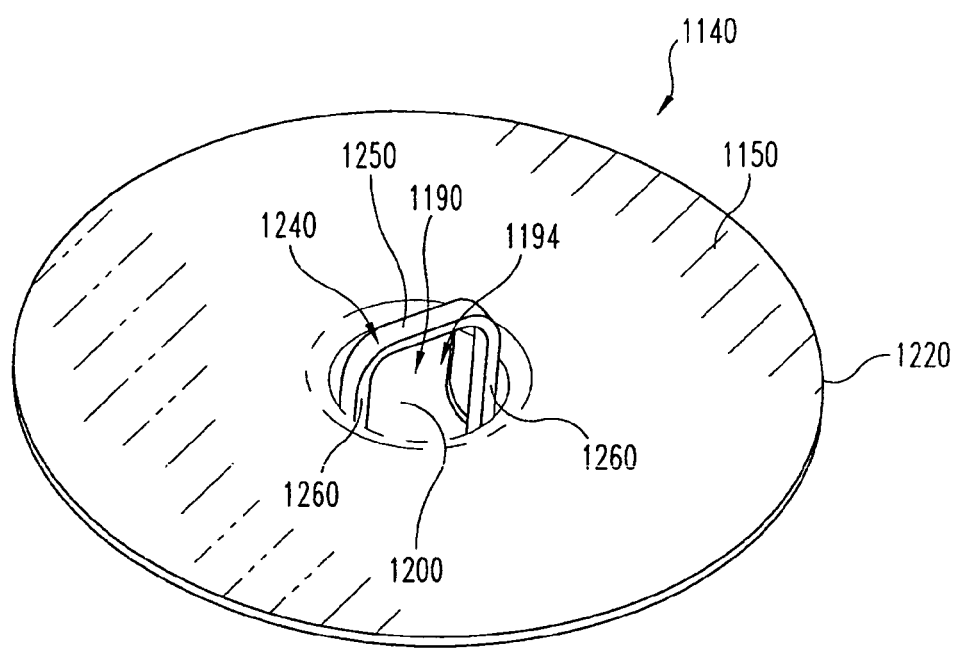
FIG. 4 is a perspective view of an endplate.

With reference to FIG. 4 there is illustrated a perspective view of an endplate 1140 for use in a replaceable filter cartridge (not shown). Endplate 1140 includes a surface 1150 and an opening 1190 having a wall portion 1200 leading to an interior cavity of filter media (not shown) defining a fluid flow path (not shown in FIG. 3). Endplate 1140 extends from opening 1190 to an outer periphery 1220 and includes a handle 1240.

Handle 1240 is preferably coupled via a snap fit to wall portion 1200 positioned within a fluid flow path 1194 leading to a filter head (not shown). In one form of the present application, handle 1240 has an inverted U-shape and includes a radial portion 1250 and a pair of axial portions 1260. Radial portion 1250 is positioned at an axial distance at least partially extending above surface 1150 and is preferably positioned slightly off center of opening 1190. In other forms of the present application, radial portion 1250 could be positioned flush with surface 1150 or positioned at an axial distance beneath surface 1150. In one form of the present application, axial portions 1260 are received into a receiving channel 1270 in endplate 1140, thereby coupling handle 1240 to endplate 1140.

The aforementioned invention contemplates each respective handle is provided to assist a user to easily interface and remove the respective filter cartridge from the shell, preferably without the use of tools. By eliminating or minimizing the need for a tool, the handle helps reduce and/or prevent damage to the shell during removal of the filter cartridge. Each respective handle is sized to receive at least one or two of the user's fingers so it may be easily grasped to assist in removal. Additionally, the handle preferably remains small enough to not cause any detrimental effect on the flow characteristics of the filtration system. To assist in removal, the user may grasp the handle and then pull, twist, and/or leverage the replaceable filter cartridge in order to remove the filter cartridge from the shell. In other forms of the present application, a tool or tools for grasping or clamping the handle may be utilized to assist in the removal of the filter cartridge from the shell. Each handle may also include a bump or offset portion preferably having a generally arch shape. The offset portion is preferably positioned radially inward from the perimeter of the sealing flange. One form contemplates the offset portion is sized to receive one or two of a user's fingers to provide an additional gripping surface to the handle to assist in removal of the filter cartridge. Some other forms contemplate the offset is sized to receive a tool or tools to assist in grasping the handle portion. While discussed as having only one offset portion, further embodiments contemplate having more than one offset portion.

As should be appreciated from the above description, the handles could be formed from the same or different materials as the respective endplates such as from metal, plastic, or an elastomeric compound. Additionally, the handles could be integrally formed with the endplates during a molding or stamping process or the handles could be separate components attached by known methods of attachment such as welding, screwing, adhesively bonding, and/or snap fitting. It should be understood that it is contemplated as within the scope of the invention that the axial portions of the handle may be lengthy enough that the handle is coupled to the centerpost rather than the first endplate or endcap.

The replaceable filter cartridges of the present invention might find application with a variety of fluids including, but not limited to, fuels, lubricating oils, and hydraulic fluids.

It should be understood that the flange, or sealing flange can also be used for alignment and/or positioning. Similarly, the flange when merged or combined with another component can be used to provide flow passages. Furthermore, the handle or protrusion from the endplate can also be used to actuate a valve system within the head, cover, or lid of the fluid conditioning system. This valve or interaction function between the cartridge and opposing component can function as, but is not limited to, the following: pressure regulation, bypass, filter identification, flow regulation or restriction (valve closes or restricts flow if cartridge is not within the system), etc.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A replaceable filter cartridge comprising:
 a substantially annular filter media defining an internal cavity, the filter media being sandwiched between a first endplate and a second end plate, the first endplate including:
  a sealing flange integrally formed with the first endplate as a unitary structure at a bottom end of the sealing flange, the sealing flange extending axially away from the filter and extending from the bottom end towards an upper edge of the sealing flange, and fluidly connected to the internal cavity via a flow opening defined by the first endplate; and
  a handle extending across at least a portion of the flow opening and coupled to the sealing flange,
  the handle including a first portion fixed to the sealing flange, a second portion spaced from the first portion and fixed to the sealing flange, and a third portion permanently extending across at least a portion of the flow opening and interconnecting the first portion and the second portion, the flow opening including a central axis, and the third portion of the handle being offset from the central axis, and the handle being integrally formed with the sealing flange and configured to remove/install the filter cartridge from/into a housing.

2. The replaceable filter cartridge of claim 1, wherein the handle is U-shaped.

3. The replaceable filter cartridge of claim 2, wherein the third portion includes an offset portion positioned radially inward from a perimeter of the sealing flange.

4. The replaceable filter cartridge of claim 1, further comprising a centerpost positioned in the internal cavity, wherein the centerpost includes a plurality of apertures in flow communication with the internal cavity.

5. The replaceable filter cartridge of claim 4, further comprising a gasket surrounding at least a portion of the sealing flange.

6. The replaceable filter cartridge of claim 5, wherein the first and second portions extend axially and the third portion extends radially across the opening, and the third portion is axially spaced above the upper edge of the sealing flange.

7. The replaceable filter cartridge of claim 4, wherein the sealing flange is located on an outer peripheral edge of the centerpost.

8. The replaceable filter cartridge of claim 1, wherein the sealing flange comprises an annular inwardly-facing surface and an annular outwardly-facing surface, the annular inwardly-facing surface further defines the flow opening, and the first portion and the second portion of the handle are at ends of the handle and coupled to the annular inwardly-facing surface.

9. The replaceable filter cartridge of claim 1, wherein the third portion of the handle has a thickness measured in an axial direction that is less than a width thereof measured in a radial direction.

10. A replaceable filter cartridge comprising:
a filter media defining a substantially columnar internal flow path sandwiched between first and second endcaps, the first endcap including:
an opening in flow communication with the substantially columnar flow path;
a sealing flange aligned with and enclosing the opening, the flange being integrally formed with the first endcap as a unitary structure at a bottom end of the flange, the flange extending axially away from the filter media and extending from the bottom end to an upper edge thereof; and
a handle integrally formed with the sealing flange and positioned such that at least a portion of the handle permanently extends across a path of flow through the opening,
the opening including a central axis, and the portion of the handle that extends across the path of flow through the opening being offset from the central axis, and
the handle being configured to remove/install the filter cartridge from/into a housing.

11. The replaceable filter cartridge of claim 10, further comprising a centerpost positioned in the substantially columnar internal flow path; wherein the centerpost includes a plurality of apertures fluidly connected to the substantially columnar flow path.

12. The replaceable filter cartridge of claim 11, wherein the sealing flange is located on an outer peripheral edge of the centerpost.

13. The replaceable filter cartridge of claim 10, further comprising a gasket surrounding the sealing flange, and wherein the filter media is a substantially annular pleated cellulose filter media.

14. The replaceable filter cartridge of claim 13, wherein the handle includes a first axial extending portion connected to the sealing flange, a second axial extending portion connected to the sealing flange, and a radial extending portion that interconnects the first and second axial extending portions, and the radial extending portion is axially spaced above the upper edge of the sealing flange.

15. The replaceable filter cartridge of claim 10, wherein the sealing flange comprises an annular inwardly-facing surface and an annular outwardly-facing surface, the annular inwardly-facing surface further defines the opening, and the handle has two ends coupled to the annular inwardly-facing surface.

16. The replaceable filter cartridge of claim 10, wherein the portion of the handle that extends across the path of flow through the opening has a thickness measured in an axial direction that is less than a width thereof measured in a radial direction.

* * * * *